Jan. 11, 1949.   F. E. McGARY ET AL   2,459,084
METHOD OF AND MEANS FOR MAKING DIES
Filed Aug. 3, 1940   8 Sheets-Sheet 1
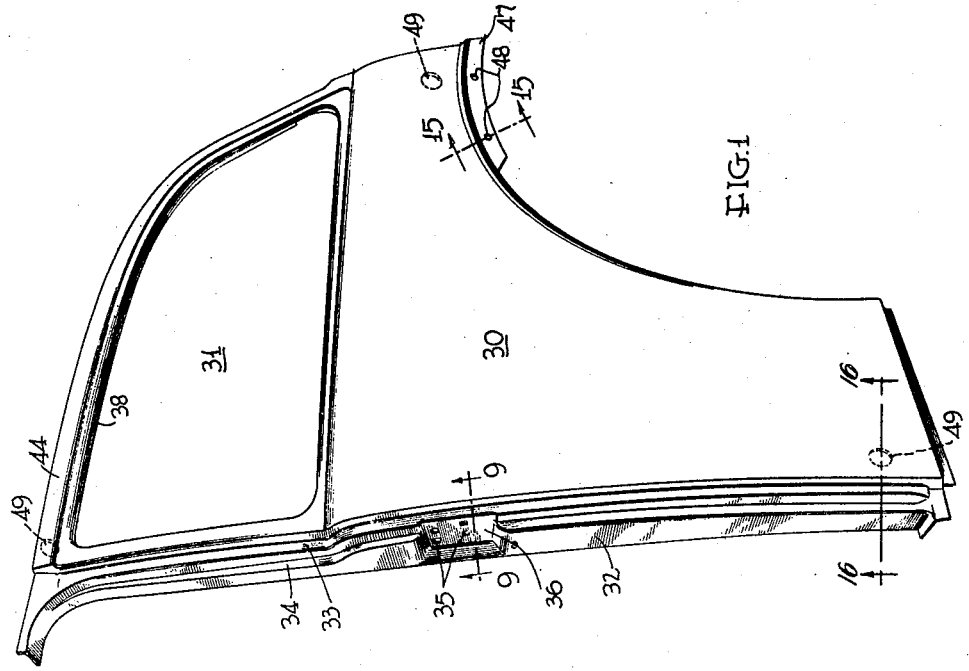
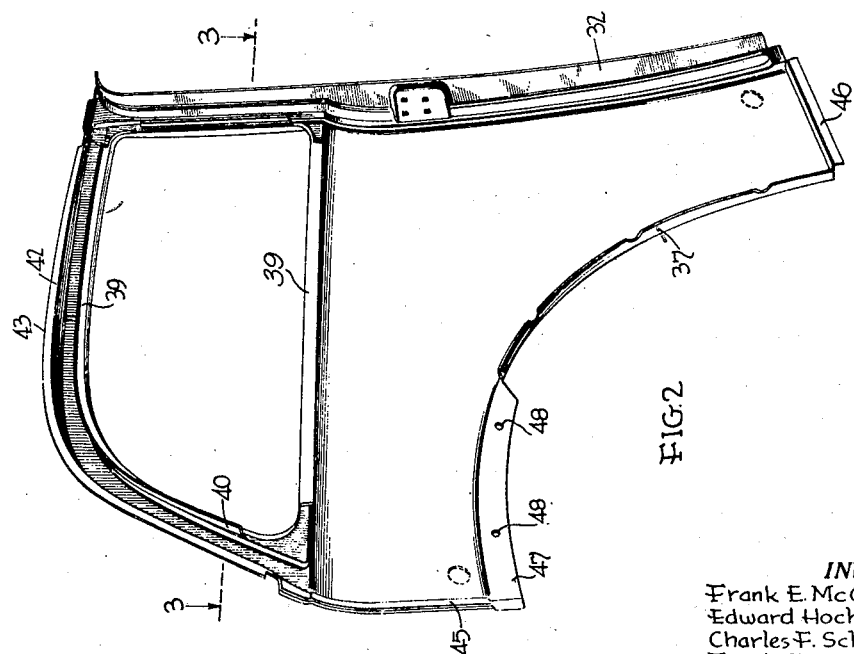
INVENTORS
Frank E. McGary
Edward Hochreiter
Charles F. Schlecht
Frank Shannon.
BY John P. Tarbox
ATTORNEY Jan. 11, 1949.  F. E. McGARY ET AL  2,459,084
METHOD OF AND MEANS FOR MAKING DIES
Filed Aug. 3, 1940  8 Sheets-Sheet 2
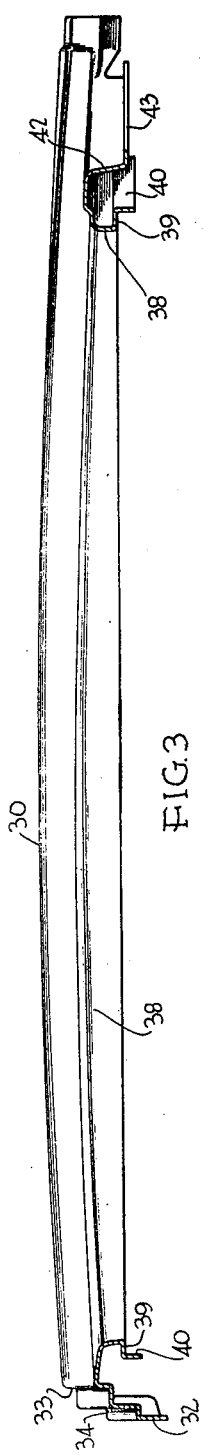
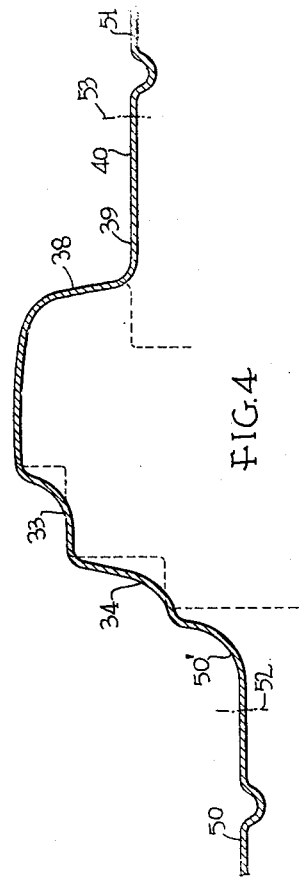
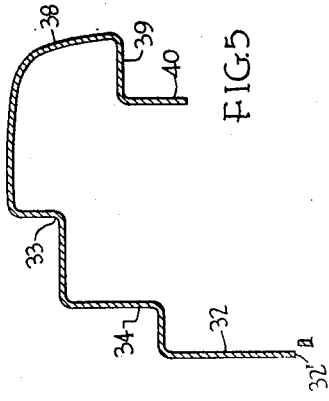
INVENTORS
Frank E. McGary
Edward Hochreiter
Charles F. Schlecht
Frank Shannon
BY
John P. Tarbox
ATTORNEY Jan. 11, 1949.  F. E. McGARY ET AL  2,459,084
METHOD OF AND MEANS FOR MAKING DIES
Filed Aug. 3, 1940  8 Sheets-Sheet 3

INVENTORS
Frank E. McGary
Edward Hochreiter
Charles F. Schlecht
Frank Shannon.
BY
John P. Tarbox
ATTORNEY Jan. 11, 1949.  F. E. McGARY ET AL  2,459,084
METHOD OF AND MEANS FOR MAKING DIES
Filed Aug. 3, 1940  8 Sheets-Sheet 4
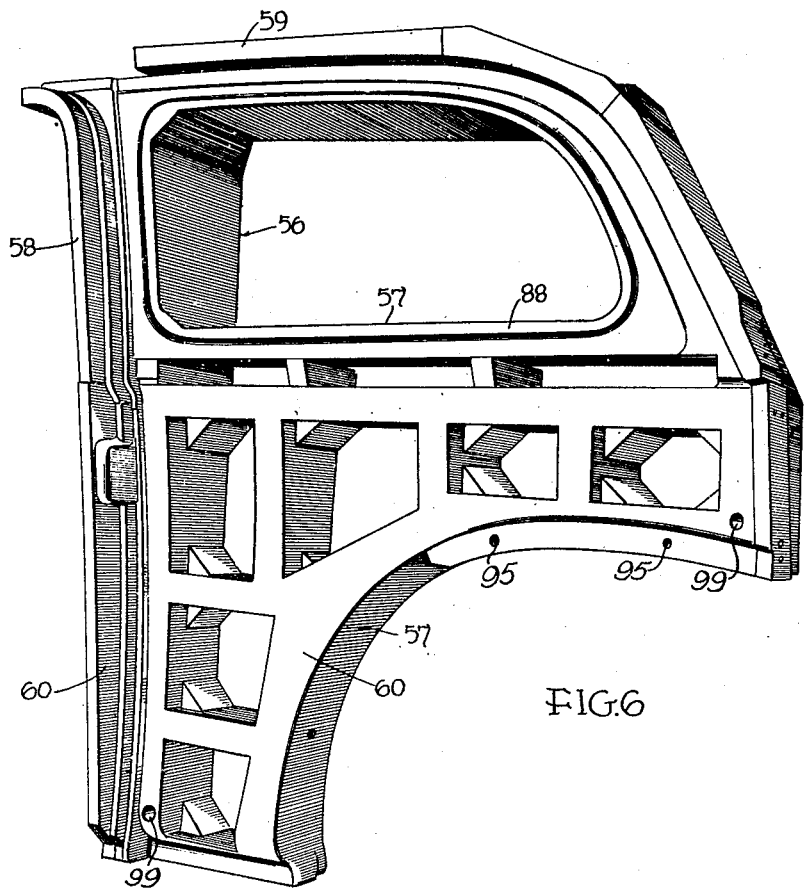
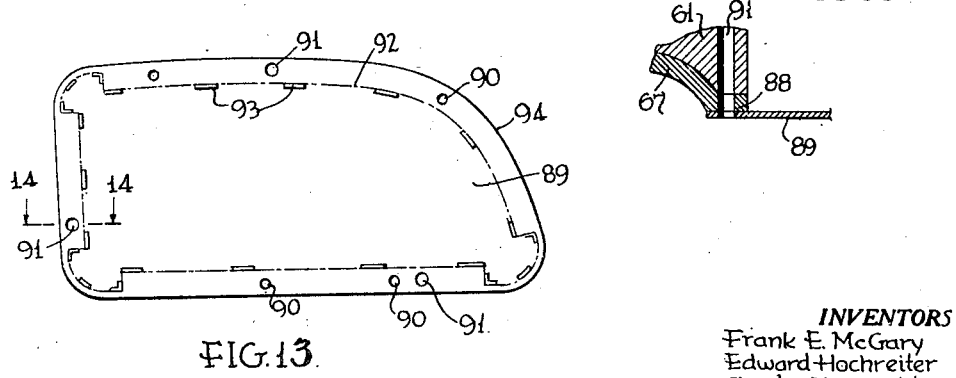
INVENTORS
Frank E. McGary
Edward Hochreiter
Charles F. Schlecht
Frank Shannon
BY John P. Tarbox
ATTORNEY Jan. 11, 1949.   F. E. McGARY ET AL   2,459,084
METHOD OF AND MEANS FOR MAKING DIES
Filed Aug. 3, 1940   8 Sheets-Sheet 6

INVENTORS.
Frank E. McGary
Edward Hochreiter
Charles F. Schlecht
Frank Shannon
BY
John P. Tarbox
ATTORNEY Jan. 11, 1949.  F. E. McGARY ET AL  2,459,084
METHOD OF AND MEANS FOR MAKING DIES
Filed Aug. 3, 1940  8 Sheets-Sheet 7

INVENTORS
Frank E. McGary
Edward Hochreiter
Charles F. Schlecht
Frank Shannon
BY
*John P. Turbos*
ATTORNEY Jan. 11, 1949.    F. E. McGARY ET AL    2,459,084
METHOD OF AND MEANS FOR MAKING DIES
Filed Aug. 3, 1940    8 Sheets-Sheet 8

INVENTORS
Frank E. McGary
Edward Hochreiter
Charles F. Schlecht
Frank Shannon
BY
ATTORNEY Patented Jan. 11, 1949

2,459,084

UNITED STATES PATENT OFFICE 2,459,084

METHOD OF AND MEANS FOR MAKING DIES

Frank E. McGary, Narberth, and Edward Hochreiter, Charles F. Schlecht, and Frank Shannon, Philadelphia, Pa., assignors to The Budd Company, Philadelphia, Pa., a corporation of Pennsylvania Application August 3, 1940, Serial No. 350,502

13 Claims. (Cl. 22—202)

The invention relates to improvements in methods and means for making dies. It is particularly applicable to those dies which are used for stamping or drawing sheet metal parts of more or less complicated shapes, such as are used in automobile bodies.

It is among the outstanding objects of the invention to match more accurately the different sets of dies entering into the forming process of one single stamping, so as to avoid the serious drawbacks of poorly matched dies.

Another outstanding object of the invention is to employ less skilled workmen in the manufacture of the dies than those previously required for this work.

A further object of the invention is to avoid the long delay of the actual start of stamping operations which was due to the necessity of determining the trim lines through tryouts of the forming dies and the subsequent making of the trim dies.

These and other objects and advantages are achieved in accordance with the invention by substituting the numerous flat templates previously used for checking dies by a "template-frame" or checking fixtures which is a negative reproduction of the shape to be imparted to the stamping, and by using this checking fixture for bringing the different dies into the exact desired shape.

In practice of the invention, a body or frame, which is provided with an approximate negative replica of the surface to be produced by the stamping operation is juxtaposed at a smalll distance from a model carrying a positive replica of shape to be imparted to the stamping. The open margins between the two spaced surfaces are then sealed and the intervening space is filled with a fluid hot material which hardens upon cooling. Means are provided to insure the adhesion of the casting material to the frame or body with the approximate negative surface. As material for casting, a metal is preferably used which has a very low melting point such as a matrix metal.

An important feature of the invention consists in using a checking fixture which is composed of a plurality of detachable parts, some of which parts are interchangeable for other parts. Such multi-piece checking fixture comprises one or more parts which conform to the contour of the stamping to be obtained in the first stamping operation, and separate detachable sections corresponding respectively to those portions of the stamping which require several stamping operations, each one of these latter parts being shaped in accordance with the required shape of the corresponding portion of a die for one of the successive stamping operations.

A further important feature of the invention consists in provision of a method for determining trim lines by means of a model of the stamping which is supplemented by pieces so as to make the model correspond to the form of the stamping after a first forming operation. This is accomplished with thin narrow strips of paper, cellophane or the like, which have one end fastened to the model. These strips are then first laid across certain portions of the model without the supplements, are cut off or marked where the edge of the stamping should be in the finished product, and are finally laid over the supplemented model, the ends of or marks on the strips then indicating approximately the location of the trim line.

Further features of the invention have to do with gauging means for the proper location of the pattern frame with respect to the different dies as well as for the proper location of test stampings with respect to the dies or to the pattern frame.

The invention consists, moreover, in means and methods for accurately determining the location of holes by means of holes or bushings in the pattern frame, or by the insertion of a plate such as a steel plate into the cast metal at points where holes have to be provided in the stamping at exactly determined locations, such plate being provided with the desired pattern of holes.

Further objects, features and advantages of the invention will appear from the following description of several embodiments of the invention and from their illustration in the attached drawings:

In the drawings:

Figure 1 is a perspective outside view of the stamping of known design which will serve for illustrating the invention;

Figure 2 is a perspective inside view of the same stamping;

Figure 3 is a section along the line 3—3 of Figure 2;

Figure 4 is a section taken in the region of the left part of line 3—3 of Figure 2 but in larger scale and showing a section through this portion of the stamping after an initial forming operation;

Figure 5 is a section similar to Figure 4, but with the stamping in its final form;

Figure 6 is a perspective view of a pattern frame made in accordance with the invention and designed for making the dies for the stamping illustrated in the preceding figures;

Figure 7 is a diagrammatic perspective sectional fragmentary view through a model of the stamping shown in the preceding figures and illustrating the formation of a portion of the pattern frame shown in Figure 6, the section being taken in the region corresponding to line 3—3 of Figure 2 of the stamping;

Figure 13 is a plan view of a template to be fastened to the margins of the window opening of the pattern frame shown in Figure 6, which template serves for marking the trim line along the margins of the window opening on a trim die;

Figure 14 is a fragmentary section along line 14—14 of Figure 13 and through the adjoining portion of the pattern frame;

Figure 24:
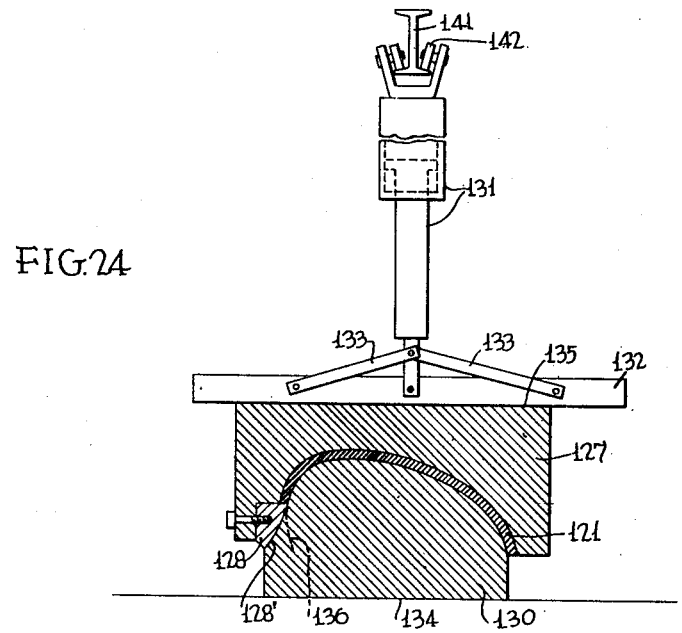
Fig. 24 is a diagrammatic section through a pattern frame for a fender as placed on the first forming die, the means for lifting and lowering the pattern frame being diagrammatically indicated.
Figure 25:
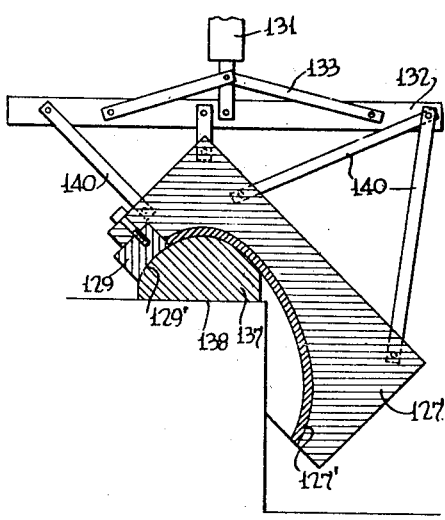

Fig. 25 corresponds to Fig. 24 but illustrates the frame on the die for a second forming operation.

Before explaining the invention by reference to the attached drawings, it appears worthwhile in the interest of a full appreciation of the invention to explain briefly the means and methods conventionally used heretofore for making dies, and the outstanding disadvantages and problems connected therewith.

According to the old method, an exact positive model of the one surface of the stamping is first made. This model is later used for roughly machining the die castings on a profiling and reproducing machine in which a cutting tool is guided by a control pin caused to travel over the surface of the model, which machine is often referred to as Keller machine. From this model a great number of templates are made. These templates consist of sheet metal plates each of which has to be held vertically to a certain base plane of the model and along a certain line, and has its one margin made to conform exactly to the contour of the model along such line. Additional templates give exact plan-view outlines of the model surface and the outline of transverse openings therein. Still further templates correspond to the outlines of certain parts of the stamping in side view. These templates have to be made with the utmost care. It is absolutely essential that the templates of the type first referred to be held absolutely vertical with respect to a certain base plane, that they be held exactly along the prescribed lines, and that their base lines be held exactly in one common plane, all this while checking whether their contour lines correspond to the contour at the respective lines of the model. It is also essential that the contour lines of the model and of openings be very accurately projected on the second and third types of templates, a task which is often difficult to achieve.

After the die castings for the different stamping, trimming and cutting operations come from the Keller machine, the templates are used for bringing them into the required final shape. Often different sets of templates are necessary for the different dies thereby increasing the danger of inaccuracies. It is obvious that the dies will only show a true replica of the model and will match one another only if the templates are again held in the exact prescribed position and locations against the respective die as has been described above in reference to the model. A slight inclination deviating from the vertical or a slight inclination of the base edge with respect to the plane of the base edge of the other templates will of necessity lead to a distortion of the working surface of the die. It is apparent that the working surfaces of the dies which are to perform the different operations (e. g., stamping and trimming) on one and the same stamping should be exactly alike so as to avoid distortion and undesired stresses in the stamping itself, and it is also obvious that this method of giving the different dies their final form by using a great number of flat templates, which have to be held individually in an exactly prescribed position against each die, must inevitably result in substantial deviation from this desired result.

In spite of every humanly possible care and the use of highly skilled, well-paid mechanics, the dies made by the old method never corresponded exactly to each other, and the stampings were warped back and forth to a lesser or greater degree each time they underwent a further forming operation. This warping not only weakened the pieces but was responsible for lack of uniformity in the product. The so-called spring-back was often blamed for inaccuracies in the finished product, whereas the real cause lay in the poor matching of the different dies and the distortion of the stamping caused thereby.

The inaccuracies of the dies which were caused by the old method of making them, required much expensive fitting work by highly skilled die makers, so as to eliminate at least the most pronounced divergencies between the different sets of dies. This resulted in still further delay of the actual start of production. The divergencies led to a comparatively great percentage of rejections of stampings due to breakage and lack of uniformity, and they were a steady source of argument between the designer of the stamping, the designer of the die, the die makers and the press-shop people, and between the die manufacturer and his customer.

Another serious draw-back of previous methods and means for making dies consisted in the fact that the first and second forming dies had to be finished and tried out first before the trimming dies could be designed and made. This determination of the form of the trimming dies was quite cumbersome and time consuming. It consisted in making sample stampings from the first forming die and cutting the edges along lines which a highly experienced die maker, according to his knowledge, deemed might correspond to the required trimming line. The further forming of the stamping in the second forming die showed how far the guess of the diemaker was correct. By repeating this process and steadily correcting the tentative trim line on each successive tryout stamping, the required accurate form for the trim line was finally determined. This method necessitated putting the first and second forming dies into the presses and making the experiments described above until the proper form of the trim line was found. The dies were then taken out again and the trim dies were made, and only after the trim dies were finished could the dies including the trim dies be put back into the presses and actual production started.

Concerning the embodiments of the invention which will now be described, it is pointed out that, though they are characteristic of outstanding features of the invention, they should not be regarded as limiting its scope. Considering the large variety of forms of stampings as now-a-days produced by mass production methods, it is obvious that many modifications are required to adapt the invention to the specific problems involved.

Figures 1 to 3 show the general form and typical sections and details of a rear-quarter side panel for a two door automobile body. This stamping does not in itself form a part of the invention, but is illustrated to facilitate understanding of the invention. The stamping comprises a lower comparatively flat main body 30 and an upper portion with a window opening 31. A flange 32 along the forward margin is designed to form a jamb face on a door opening. 33 and 34 are sharp cornered rabbets along the outer margin of said flange. 35 are holes in a depression 36 of flange 32 which serve for the attachment of a lock catch or a door hinge. An inwardly turned flange 37 along the lower curved margin is designed for the fastening of the wheel housing and fender (not shown). The opening 31 is surrounded by an inwardly directed beading 38 and flanges 39 which latter extend away from the center of the opening and about parallel to the general plane of the stamping. Flanges 39 are continued along the forward, upper and rear side of the opening, by inwardly extending flanges 40, the flanges 39, 40 serving for the reception of the margins of a window pane (not shown).

The outer margin along the upper and rear side of the opening 31 is provided with inwardly and then laterally directed flanges 42, 43 which serve for the fastening of the roof and rear wall panel (not shown) directly or by means of an intervening (not shown) drip channel or the like. The portion of the stamping between said flange 42 and the adjoining portion of the window beading 38 is outwardly beaded at 44. The rear edge of the stamping in the region below the window opening is inwardly offset and laterally flanged at 45, this offset portion serving for the reception of the front edge of an adjoining (not shown) panel. The lower edge between the flange 32 and the curved flange 37 is likewise inwardly and laterally flanged at 46. Certain of the marginal portions 47 are provided with holes such as at 48, and the locations of gauge holes are indicated at 49.

For making a stamping of the type shown the following principal forming operations and appertaining sets of dies are usually required. These different dies are not shown but a brief enumeration will be helpful for the understanding of the invention.

The pair of complemental dies constituting the first forming dies are forced together against the intervening blank to bring the originally flat metal sheet into approximately the cross-sectional configuration (see Figure 4) of the finished product. Certain sharp corners, such as in the region of the rabbets 33, 34 and the flanges 39, 40, of this first die are, however, stamped only to an intermediate shape in these dies, so as to avoid ruptures. In these first forming dies most of the flanges along the outer margins and along the margins around the window opening are brought into a preliminary form only, and marginal portions 50, 51 of the original sheet, which will not appear at all in the finished stamping, are not yet cut off. The last-named portions 50, 51 are gripped in the first operation by the so-called blank holders of the dies.

A pair of trim dies severs marginal portions 50, 51 from the stamping along lines 52, 53 in Figure 4. Some of these lines (e. g. 53) will represent the final edges, whereas others (e. g. 52) may need a subsequent more accurate trimming operation. These trimming dies may be provided with punches to punch holes lying in the main plane of the stamping, such as the holes 48.

A second set of forming dies now brings most parts of the stamping, including the sharp cornered rabbets and flanges and also the so-called run-off portions 50', with the exception of the under-cut flanged portions 39, 40, into their final shape (see Figure 5).

So-called finger dies then bring the flanges 39, 40, around the window opening into the final shape. A further set of trim dies accurately cuts (as indicated in Fig. 5) the inner edge 32' of door opening flange 32 and punches the before-mentioned holes 35 in that flange.

This brief description shows how one and the same stamping has to be gripped between the unyielding rigid surfaces of a comparatively great number of different pairs of dies and how important it is that these gripping surfaces be alike in each set of dies so as to avoid the before-mentioned distortions and warpings with all their disadvantages.

In making the checking fixture or pattern frames to which the invention is applied, a model presenting the one surface of the stamping is at first made substantially as it is required for the above described old method, any necessary allowances being put into this original model. A typical cross-section through such a model 54, which may consist of wood or plaster of Paris, is diagrammatically shown in Figure 7. The surface of this model corresponds to the outer surface of the stamping shown in Figures 1 to 3 and the cross-section of Figure 7 is taken substantially along a line corresponding to line 3—3 of Figure 2. The parts of the model surface are numbered the same as the corresponding parts of the stamping. It will be noted that this model does not show the form of the under-cut flanges 39, 40 of the stamping and may be solid in the region of the window opening, the solid portion 55 having its surface in the plane of flange 39 of the stamping illustrated in Figure 4.

It may facilitate the understanding of the further more detailed description to inspect Fig. 6 at this point, and to note that it shows one form of the complete pattern frame 56. This pattern frame 56 comprises a central or main portion 57 and demountable marginal pieces such as 58, 59, and has a surface 60 formed on a lining of the frame members. This surface is a negative replica of the surface of the stamping or model and is obtained from the model as will presently be described.

The central frame portion 57 comprises a base 61 (Figure 7) which may be of mahogany and which has its surface 62 shaped as an approximate negative replica of that central portion of the model which represents the portion of the stamping to be brought into its final shape by the first set of dies. At the sides 61' the base also follows the outlines of said portion. After surface 62 has been prepared, as by insertion of nails 63, to hold metal to be cast over it, the base 61 is suspended over the portion just referred to of the model 54 with its surface 62 slightly spaced—say, ⅜" to ½"—from the model surface. Now the openings between the margins of the base and the adjoining surface portions of the model are carefully sealed by cardboard strips 64, adhesive tape 65 and plaster of Paris 66 or by any other appropriate means. Then a metal of low melting point such as matrix metal obtainable for instance under the trademark "Cerrobend" (50% Bi, 13% Sn, 27% Pb, 10% Cd) is poured into the sealed clearance space through one or more openings (not shown). The metal should have such a low melting point that it does not destroy the positive model or the rough negative model even if the model is made of plaster of Paris or wood, and the negative model of wood. After hardening, the sealing means 64, 65, 66 are removed and the metal forms a lining 67 which adheres to the base 61 and may be removed from the model therewith. The free surface of the lining 67 presents the desired negative replica of the surface of the positive model.

Figure 8:
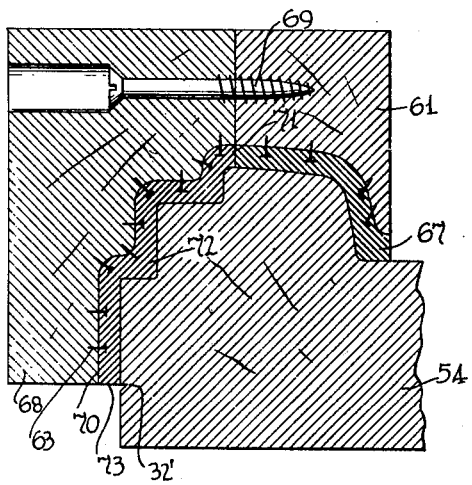
Figure 8 is a section corresponding to Figure 7; but showing the pattern frame in a further advanced stage.

Additional marginal base members 68 (see Fig. 8) are now demountably attached to the central base 57 by means of screws 69 or the like, so that the members 68 can be detached and put in place again in exactly the same relative location with respect to the central base member 57. The one surface 70 of the additional members 68 is an approximate negative replica of the respective marginal portions of the model and is provided with nails or the like 63. The end surface of the metal lining 67 of the central negative form is now isolated at 71, by a layer of adhesive tape (not shown) and, after the central and marginal base members are placed on the model, the free margins are again sealed up and metal poured in the empty space just as previously described.

The metal lining 72 now forms an exact negative replica of the stamping in the respective regions. The lower surface 73 is arranged at the level of the final trim line for the edge 32' (see Fig. 5).

Figure 9:
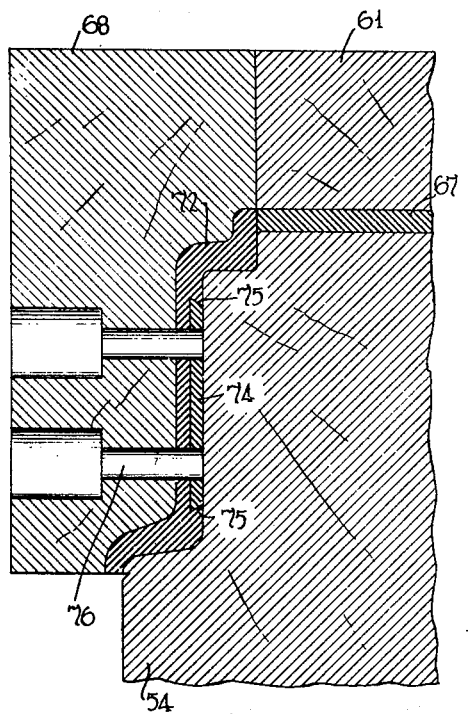
Figure 9 is a section through the model and the marginal portion of the pattern frame in the region which corresponds to line 9—9 of Figure 1.

At the location of the holes 35 in the flange 32, a gauge plate 74 is attached, e. g. by some small pins (not shown), to the surface of the model 54 before placing the frame members 68 on the model (see Figure 9). The plate 74 is located so that the holes in this plate register exactly with the location of the holes of the finished stamping. The molten metal 72 flows around this plate 74 in the casting operation of Figures 8 and 9, and the plate 74 is held therein owing to the dove tail shaped margins 75. This embedded gauge plate allows the location of the punching holes in the trim die to be determined with utmost accuracy by just drilling through holes 76 and the frame member 68 and its alloy lining 72 from the side of the plate 74 and by later drilling through the holes so made from the opposite side after the pattern frame is placed on the punching die, as described hereinafter in discussion of the showing of Figure 15. Compare the similar conditions illustrated in Figure 9 and later on described.

Figure 10:
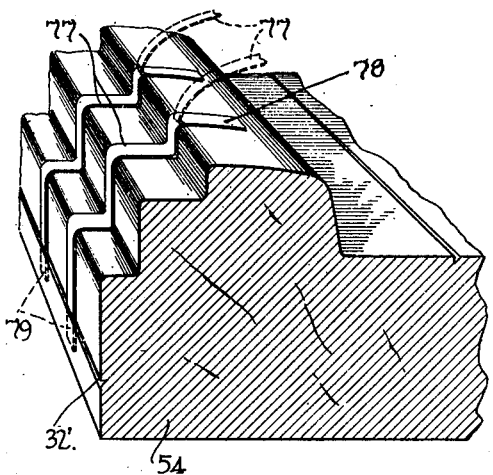
Figure 10 is a diagrammatic perspective fragmentary view, partly in section, of the model as shown in Figure 7, but without any frame member. It illustrates a first step for determining an outer trim line.
Figure 11:
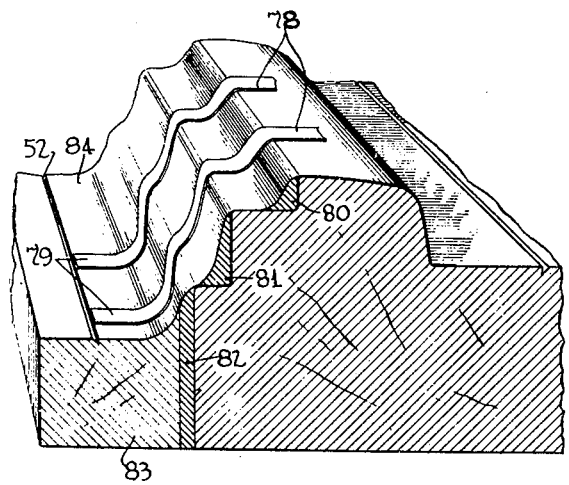
Figures 11 and 12 are views corresponding to Figures 10 and 8, respectively, illustrating a modification of the model constituting a step in practice of the invention.

The determination of the trimming line is illustrated in Figs. 10 and 11. As shown in Fig. 10, narrow strips 77 of paper, adhesive Cellophane tape or the like are attached to the model transversely to the region corresponding to marginal flange 32 and to the rabbets 33, 34 and thereby across those zones which will not be brought into the final form by the first stamping operation. See in this connection Fig. 4. The upper ends 78 of the strips are, however, attached to a surface portion which will be brought into final shape by the first operation. After the strips 77 are made to follow closely the contour of the model with all its recesses and edges in the respective region, the lower ends are cut off at 79 or otherwise marked along the trim line 32' of the finished stamping as inscribed on the model 54. Hereupon the lower ends of the strips are taken off and bent back as shown by dotted lines at 77 in Figure 10, leaving the upper end 78 securely in place on the surface of the model. The next step consists in supplementing the model by pieces 80, 81, 82 and 83. The supplemental pieces 80, 81 and 82 level off the sharp rabbets and edges of the final surface and the surface 84 of the piece 83 represents the so-called run-off; compare again the initial form of the stamping shown in Fig. 4. Now the strips 78 are extended again along the surface of the model and of the additional pieces 80 to 83 and the ends 79 indicate where the trim line 52 (Figure 12) should be located on the run-off. Sometimes the reading of these strips has to be slightly corrected in accordance with experience values. Mostly this line will be extended a bit further outwardly than shown in Fig. 11 so as to allow a further accurate trimming operation as indicated in Fig. 5 after the final forming operation.

Figure 12:
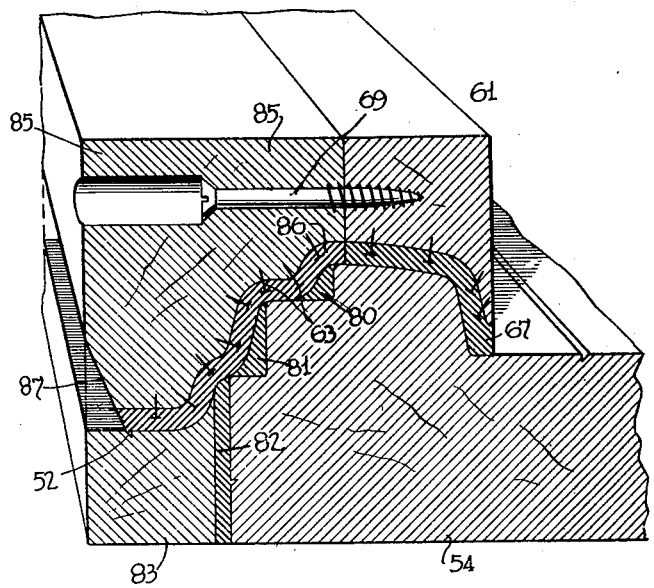

The additional members 68 with their lining 72 are taken from the central frame member and replaced by similar replaceable members 85, which are then fastened to the base 61 by the screws 69, as illustrated in Figure 12. After the central frame with the supplemental pieces 85 has been placed over the model which is supplemented by the pieces 80 to 83, the open ends between the additional pieces 85 and the model are sealed up as previously described in connection with Figure 8, metal is poured in and a true negative replica of the modified surface of the model is obtained on the metal lining 86 of the members 85.

The additional member 85 with its lining 86 may at first have the approximate configuration at its one edge indicated by dotted lines at the left in Figure 12. The edge portion, dotted-in in Figure 12, is then cut away so that the inclined cut surface 87 hits exactly on the trim line 52 marked on the member 83 whereby this trim line is transferred to the lining 86 of the frame member 85. Of course, the surface of this member 85 is also provided with nails 63 or otherwise prepared for making metal adhere to it.

Regarding the supplementary pattern frame members corresponding to 68 and 85, it may be mentioned that they will often be formed exclusively from the metal shown as lining in the diagrammatic drawings, that is without an extra supporting member such as the members 85. These additional pieces are often so small and especially of such small cross sectional area that there would not be proper room for an extra supporting member. If such supporting members 85 are dispensed with, a proper mould has of course to be formed for the respective surfaces of the additional structure and the metal thickness chosen so as to make the members strong enough.

For certain portions of a stamping it was found advantageous to combine the new frame structure with a template or gauge plate of substantially conventional design. Such a situation occurs, in the case of the stamping used for the illustration of the invention, in connection with the template for marking the edge between beading 38 and flange 39 and for marking the trim line around the window opening. The surface of the central frame member extends at 88 (Figures 6 and 14) toward the middle of the opening without defining exactly the trim line in this region. A template 89 (Figure 14) is placed on this surface, and attached thereto by a number of screws passing through holes 90. A number of registering gauge holes 91 also extend through the pattern frame and the template. The configuration of the trim line 92 around the opening is inscribed on this template and a great number of slots or openings 93 are provided in this plate and have their one edge coinciding with the inscribed trim line so that the plate can later on be laid on a die and the respective sections of the trim line be marked through those openings.

In the case of such simple reversely bent flanges as the flanges 39, 40, in the stamping serving for the illustration of the invention, the configuration and location of the trim line can be determined with sufficient accuracy by measuring at a great number of points the aggregate width of those flanges and then marking the same distances from the outer margin 94 of the template 89, this margin indicating the edge between beading 38 and flange 39 of the stamping.

Figure 15:
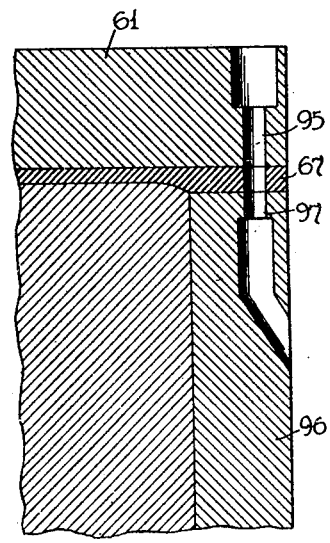
Figure 15 is a diagrammatic section through the pattern frame placed on top of the punching and trimming die in the region serving to form the stamping along line 15—15 of Figure 1.

The before mentioned gauge holes 91 can often be dispensed with. If this procedure is adopted, the pattern frame with the template is then first placed on the die and certain accessible points of the gauge plate are marked on the die. Hereupon, the pattern frame and the gauge plate are taken off, the two separated from each other and finally the gauge plate held again on the die in the exact location by the inscribed marks. Of course, the use of gauge holes in the pattern frame and the drilling of the corresponding gauge holes into the die through the holes in the pattern frame is more reliable for properly positioning the template.

Where holes such as the holes 48 have to be made in the stamping, holes 95 (Figure 15) are drilled in the pattern frame and it is simply necessary to place the pattern frame 61, 67 on the die 96 and to drill through the holes 95 in the frame 61 and its lining 67 into the die 96 at 97, to make corresponding punching holes in the die 96 (see Fig. 15).

Figure 16:
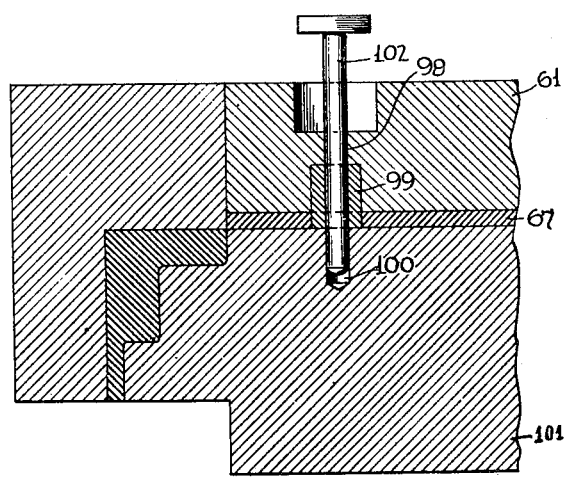
Figure 16 is a diagrammatic section through the pattern frame and the forming die in the region of these members which correspond to the section along line 16—16 of Figure 1.

For checking purposes it is desirable to have registering gauge holes in the pattern frame, in the die and in one or more sample stampings. Such gauge holes may be located as previously mentioned, and as shown in Fig. 1 at 49 in the stamping. Any suitable points of the stamping may be chosen for this purpose. For making a gauge hole in the pattern frame holes 98 are drilled transversely through the frame and provided with bushings 99 (Figure 16). These bushings may be made of steel and cast into the lining 67. Through the borings and bushings 99 holes 100 are then drilled at exactly the corresponding location into the die 101 as shown in Fig. 16. 102 illustrates a gauge pin, which is used for holding the pattern frame in exact registry with respect to a die or a sample stamping, or holding a sample stamping with respect to a die.

Figure 17:
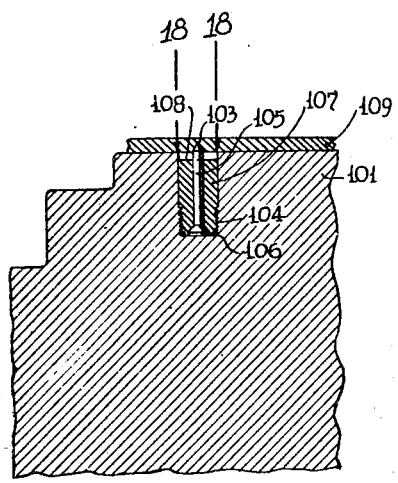
Figure 17 is a section through the die in the same plane as Figure 16 with certain members inserted.
Figure 18:
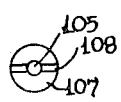
Figure 18 is a fragmentary view in the direction of the arrows 18—18 of Figure 17.

So as to obtain corresponding gauge holes in the stamping, the procedure and means illustrated in Figs. 17 and 18 are used. After the stamping has been brought into its final form, marking points 103 are inserted into the working surface of the final forming die 101. It is necessary that this point 103 be precisely centered with respect to the hole. To achieve this, the simple hole 100 shown in Fig. 16 is extended inwardly and in the extended portion screw threaded at 104. A sharp concentric point is formed at the end of an exactly calibrated pin 105 having a head 106 at its opposite end. This pin is inserted into the correspondingly calibrated boring of a bushing 107, the outer cylindrical surface of which is exactly concentric to its boring and has the same diameter as the boring in the die 101. This bushing 107 has its inner end likewise screw threaded at 104, and the outer end is slotted at 108 for the insertion of a screw driver. The longitudinal dimensions of the boring in the die, of the pin 105 and of the bushing or sleeve 107 are such that the head of pin 103 is firmly held against the end of the boring, that the sleeve 107 does not project beyond the die surface and that the hardened point 103 projects slightly, say 1/32", over said die surface.

After a sample stamping 109 has been brought into its final shape by the die 101 without the points 103, the members 105, 107 are inserted and the same stamping 109 once again pressed between the lower die 101 and its mate (not shown). The points 103 penetrate into the surface of the stamping and leave a mark which is subsequently used for centering a hollow-mill. Such hollow-mill consists of a short drill of small diameter which is inserted in a hoe cutting tool. The short drill enters said mark first and subsequently forms a guide for said cutting tool, the latter being gauged exactly to the desired gauge of the boring 100 in the die, of the boring in the bushing 99 of the pattern frame and of the outer diameter of the pin 102.

As shown in Fig 6, the negative model of the stamping surface does not present an uninterrupted surface but presents some kind of a lattice work, the actual surfaces being applied to the members of a skeleton framework. Care of course has to be taken to arrange a frame member in all regions where the cross section and the form of the surface of the stamping is intricate. This applies in the case of the embodiment shown to the belt line region and to the surrounding of the window opening, but it does not apply to the lower main part 30 of the stamping below the belt line, where a few narrow members suffice to accurately determine the entire surface of this region.

The making of the dies by means of the pattern frame of the type described above, and certain features of the frame itself, will now be briefly described as far with respect to features which might not be fully obvious from the preceding description and from the Figs. 1 to 18.

Castings of the dies are at first brought into approximately the desired form on the Keller machine by prior art procedure, using the model 54 or a plaster duplicate thereof.

The surface of the checking fixture or pattern frame is now covered with an appropriate colored, sticky, slow drying substance such as Prussian-blue and lowered upon the different male dies in the required position. The colored substance marks the spots where the frame surface touches the die surface. After lifting the pattern frame those spots are ground, filed, chiseled, scraped or sandpapered down, the frame again applied, lifted off, the newly marked spots worked down, and so on until the entire die surface gets uniformly in touch with the pattern frame surface. This procedure is substantially identical with the procedure which is in common use for finishing the mating female die from the male die and requires therefore no further description in detail.

It should be noted that the marginal portions of the pattern frame are shaped so as to permit the checking surface to be brought into contact with the working surface of the dies. This is shown, for instance, in Figures 15 and 16.

It will be understood that there will be used for checking the first forming die, the central frame part 61, 67 with the removable pieces 85, 86; for the first trimming die the same members and the template 89; and for the second forming die, the final trim die and the finger dies, the central frame 61, 67 and the removable pieces 68, 72, 74 will be used.

Trim edges are scribed and formed on the dies by means of the trim lines on the frame and the template 89. Punching and gauge holes are scribed or drilled through the holes in the frame as previously described. It will be understood that the trim edges and holes should only be formed after the surface of the respective dies is in its final shape.

The different dies produced in accordance with the invention, may in their construction be substantially identical with the dies produced by the old methods, save for certain details such as the gauge holes and the gauge hole marking device which have been previously described. The important difference consists, of course, in the greater accuracy of the dies produced in accordance with the invention.

By appropriate placing of the different dies side by side and a suspension of the frame movably with respect to the dies, for instance on a translatory movable or a swingable arm, it is possible to work on several or all dies simultaneously. This results in a further cutting down of the required time for making a set of dies up to the point where actual production of the stampings can be started. Means for suspending the frame, and for lowering it upon and lifting it from the dies are shown in Figs. 24, 25, and will be described later on.

The mating female dies are made from the male dies in the conventional manner.

Now the modifications or specific adaptations of the invention as shown in Figs. 20 to 25 will be described.

Figure 19:
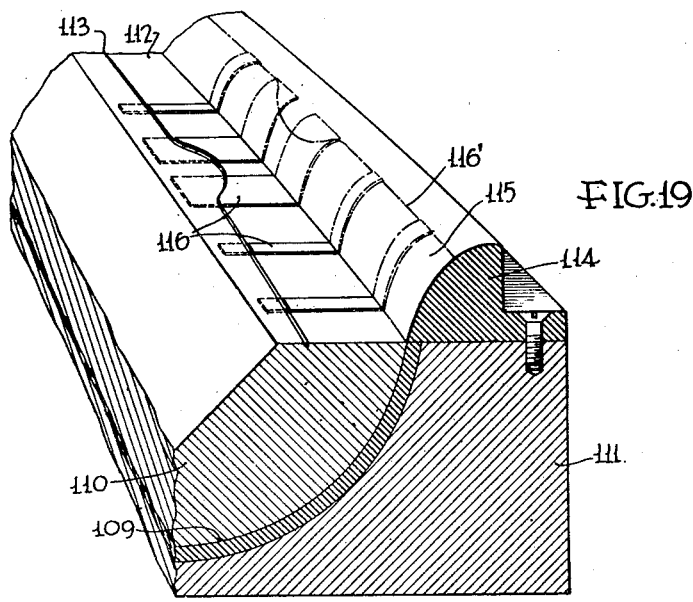
Figure 19 is a fragmentary perspective diagrammatic view partly in section illustrating the determinating of the trim line on the pattern frame in a region where the stamping has an undercut flange, such as along the lower margin of the window opening.

The trim line determining system shown in Figs. 10 and 11 may be modified, especially where undercut flanges are concerned as illustrated in Fig. 19. This figure shows a fragmentary perspective, partly sectional, view of a model of and the pattern frame for a fender with an inturned flange but might also be used for the flange 29 along the lower edge of the window opening in Figure 2. The form of the fender proper is represented by the surface 109 of the model 110 and the frame main portion 111. The location of the inturned flange is represented by the surface 112 and the edge of the flange by line 113 on the model. 114 is a removable frame member shaped with run-off surface 115 for the first forming operation. Strips, bands or the like 116 are clamped between the surfaces 109 of model 110 and frame member 111. These pieces are first folded down on surface 112 of the model and cut off along the line 113 and then extended along the run-off surface 115 where their ends indicate the location and form of the trim line 116', which can now be inscribed and later on used for making the trim die, as previously described.

Figure 20:
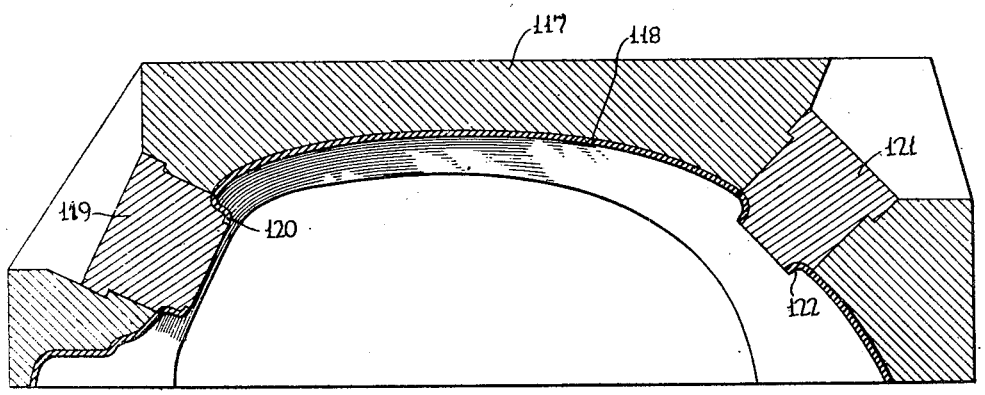
Figure 20 is a diagrammatic section through the frame for a roof panel which comprises the windshield and rear view opening.
Figure 23:
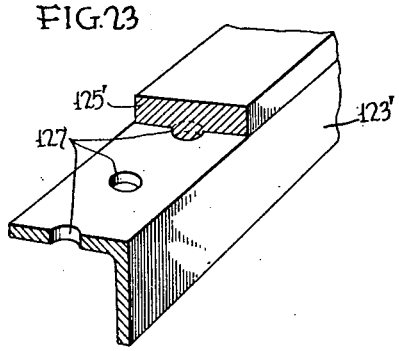
Figure 23 is a view corresponding to Figure 22 but showing a somewhat modified member.

Figure 20 shows a diagrammatic section through the pattern frame for a stamping such as a stamping including the roof and the upper parts of the front and rear wall of an automobile body, the latter surrounding the windshield and the rear view opening, respectively, and comprises undercut portions which would prevent the pattern frame to be taken off from the model and later on from the die, if this frame were made in one piece. As shown in Fig. 20, the frame consists of a main portion 117 with the lining 118 and two separate members 119 with lining 120 and 121 with the lining 122. The lining 118 is shaped in accordance with the surface of the main portion of the stamping whereas the linings 120, 122 are shaped in accordance with the surface around the windshield and the rear view opening. The portions 119, 121 are guided in the main body 117 in a direction perpendicular to the general plane of the respective openings. This retractability fulfills a double purpose. On the one hand, it allows lowering of the frame down on the model or the die with the portions 119, 121 retracted. Members 119, 120 are then pushed inwardly into the position illustrated. To remove the pattern frame this procedure is reversed. The members 119, 121 are exchangeable corresponding to the members 68, 85 of the previously described embodiment so as to make one set of members correspond to the surface of a preliminary form of the stamping and the other to the final form of the stamping. Provision should, of course, be made that the members 119, 121 are held in exactly the required position with respect to the main member 117. It may also be mentioned that a pattern frame for such a big article as a roof would not consist of solid material but of a lattice work similar to that shown in Fig. 6 or as shown in Figs. 21 to 23, the showing of Fig. 20 being purely diagrammatic.

The framework for supporting the cast lining may consist of any appropriate material. A framework of mahogany was found to be quite satisfactory although any kind of wood expands and contracts within certain limits in dependence upon the change of atmospheric conditions. Supporting frames of metal, such as shown in Figs. 21, 22, and 23, are stronger and even less expensive.

Figure 21:
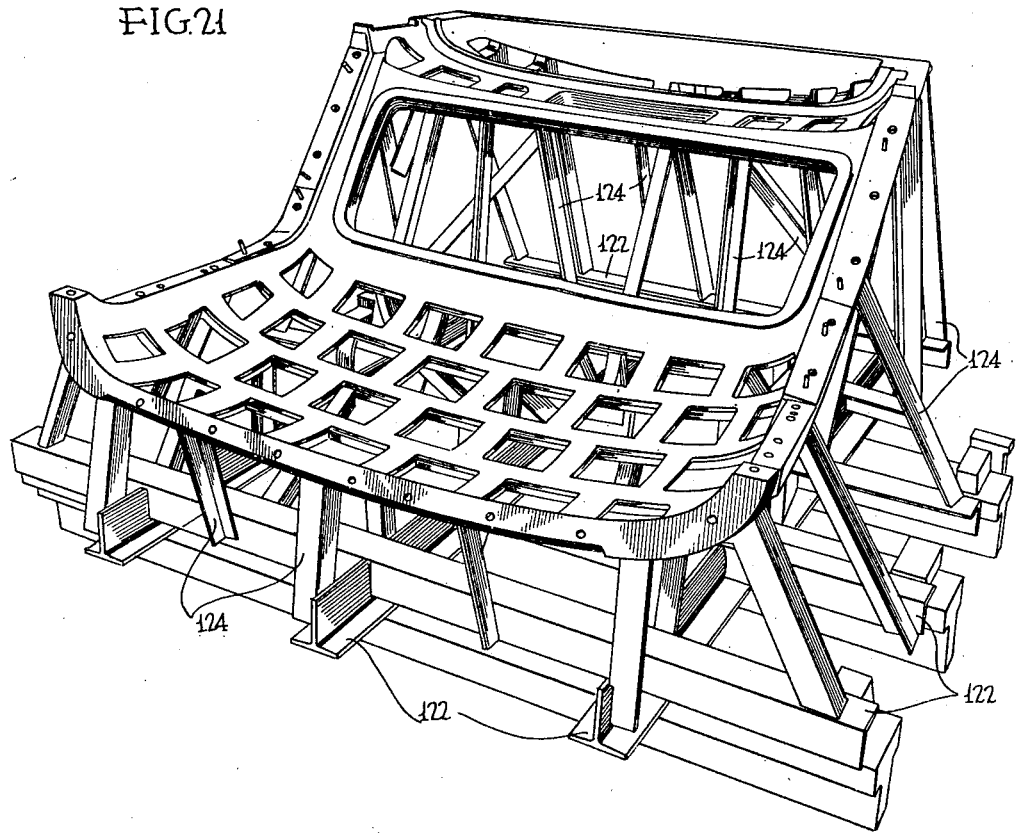
Figure 21 is a perspective view illustrating a further improved form of the pattern frame with a metallic supporting structure.
Figure 22:
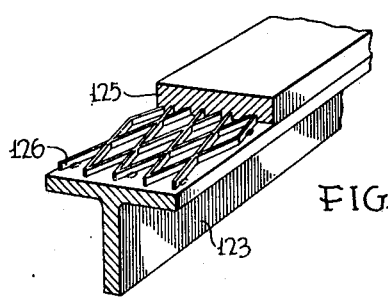
Figure 22 is a fragmentary view of a member of the frame shown in Figure 21.

The frame shown in Figs. 21 and 22 comprises a comparatively heavy base welded together from section irons 122. The approximate negative surface of the model is formed by a lattice work of section irons, such as angle or T-irons 123 and these last-named members are supported on the framework 122 by a skeleton work of upright and diagonal braces 124. The members 124 may be angle, T, U or other section irons. All these members 122, 123, 124 are securely fastened to each other as by gas or electric arc welding in such a manner that an absolutely rigid structure is formed. The members 123 are prepared for the firm adhesion of the metal lining 125 by expanded metal 126 which latter is fastened, as by gas or arc welding, to the surface of these members. The provision of holes 127 in the members 123', as shown in Fig. 23, where the metal lining 125' flows into and is held by those holes, is still less expensive, and constitutes a satisfactory procedure.

Figs. 24 and 25 illustrate diagrammatically the suspension and the use of a pattern frame for making dies which latter will work on the same stamping, but in different directions.

In Figure 24, 127 is the main member of the frame with a metal lining 127', and 128 is a demountable part of the pattern frame for a first forming die with the run-off surface section 128'. Fig. 25 shows the member 128 replaced by member 129 with the surface 129' for checking the final forming die.

For making the first forming die 130 as shown in Fig. 24, the frame is firmly suspended on a pneumatic or hydraulic hoist 131 by beams 132 and braces 133, so that the base 134 of the die 129 is substantially parallel to the supporting base 135 for the die. The die will be used for stamping in a plane perpendicular to its base 134.

The surface of the stamping has an undercut portion, as indicated by the dotted lines 136 in Fig. 24. The demountable member 128 of the frame 127 shown in Fig. 24 is obtained by supplementing the model along line 136 by a piece corresponding in principle to the pieces 82 and 83 of the first embodiment. In the embodiment illustrated in Figures 24 and 25, as is the case in the previously illustrated and described embodiments, the marginal portions of the pattern frame with their alloy lining and exchangeable pieces are shaped so as to permit the checking surface to be brought into contact with the working surface of the dies.

The undercut portion 136 is formed in a second forming operation acting upon the work in a different direction. The die 137 for this second operation is diagrammatically shown in Fig. 25. 138 is the supporting surface of this die. The frame 127 comprises now the different demountable piece 129 and is supported again on the hoist 131 with its beams and braces 132, 133, yet in a different angular position by means of additional braces 140, so that it may be raised and lowered on the die 137 in a direction perpendicular to the latter's supporting base 138.

The hoist 131 is supported on a rail 141 by means of rolls 142. This allows the moving of the hoist 131 with the frame 127 from one die to another. Besides, the rail 141 may be swingable and/or translatory movable to obtain still greater freedom in moving the frame to a greater number of dies.

The models from which the pattern frames are made, as illustrated herein, show the form and dimensions of the inside surface of the stamping.

A further feature of the invention consists in the fact that the pattern frames for two or more stampings which will be fitted together, such as inside and outside door panels, are first fitted into each other and the coordination of their forms and dimensions is then checked and, if necessary, corrected. This presents a means for not only making the different dies for one stamping to match but to match even the dies for different stampings, which stampings will be united with each other later on into one structure.

In conclusion, some of the outstanding advantages of building checking fixtures on pattern frames for tools in accordance with the invention may be summed up as follows:

1. The pattern frames give accurate forming dies—one operation matched with another.
2. Holes can be put in the pattern frames and matched with formed shapes when building dies, giving accurate piercing dies.
3. Trim dies can be made and trim lines matched with formed shapes when building dies, giving accurate trim dies.
4. Trim dies can be made without waiting for tryout template development.
5. Tryout template force is reduced, eliminating all double-action template development for trim dies.
6. Tryout time is reduced.
7. Machine shop time is reduced due to working with frame instead of numerous templates and taking time to set them up for check.
8. Metal finish is improved.
9. Preproduction losses are cut due to having trim dies two weeks earlier.
10. Special rates are reduced.
11. Customers are better pleased with improvement in quality.
12. Assemblies go together better.
13. Pattern shop labor is increased for building of frame, but cost is offset by additional savings.
14. Customer charge-back costs are reduced.
15. Machine shop can work with less experienced machinists.

Apart from the embodiment of the invention and its modifications and its adaptations as shown and described up to this point, it is obvious as previously mentioned that the invention is not limited to the particular embodiments illustrated, and may be adapted to the specific requirement of each die. Devices of the type described herein may not merely be used for checking but they may also be used for bringing the die into its final shape; indeed, they may even be used for shaping the die from the raw casting to its final form by attaching them to a copying machine. Various modifications are intended to be covered by this patent.

What is claimed is:

1. That method of fabricating a checking fixture conforming to the shape of a master model which comprises building up a framework of side and cross members generally conforming to the shape of the master model, applying alloy retaining means to a surface of the framework, masking off the space between said members and the master model, introducing molten Wood's metal alloy between said members and the master model to form a checking surface, removing the framework and alloy checking surface from the master model when the alloy solidifies, introducing removable plugs having surfaces generally conforming to the shape of the master model in the spaces between said members, applying alloy retaining means to a surface of said plugs, introducing molten Wood's metal alloy between said plugs and master model to form a checking surface, and removing the checking fixture from the master model when the alloy solidifies.

2. The method of forming a female checking fixture having means to locate flange and trim lines which comprises superimposing a framework on a master male model in such a manner that a free space of small dimension having large surface area per unit of volume is interposed between the bottom of the framework and the surface of the master model, positioning retaining means such as nails in the framework with their heads projecting into the free space, introducing molten alloy of the Wood's metal group into said free space to engage the heads of the nails and bond the alloy to the framework, and removing said framework and alloy from the master model when the alloy solidifies for use as a checking fixture.

3. That method of fabricating a skeleton checking fixture having means to locate flange and trim lines and conforming to the shape of a wood master model which comprises building up a framework of side and cross members generally conforming to the shape of the master model, applying alloy retaining means to a surface of the framework, masking off the space between the members of the framework and the master model, introducing molten alloy of the Wood's metal group between said members of the framework and the master model to form a checking surface on the checking fixture accurately conforming to the contour of the master model without burning or otherwise scoring the master model, and removing the skeleton checking fixture from the master model when the alloy solidifies.

4. That method of forming from a master male model a female checking fixture having all necessary flange and trim lines pierced holes and all contours and shapes of the master model which comprises superimposing on the master model a wood framework having portions terminating adjacent the surface of the master model whereby a free space having relatively large surface area per unit of volume lies between the master model and the adjacent portions of the framework, introducing retaining means having outwardly flared projections into the portions of the framework positioned to lie adjacent the master model in such a manner that the outwardly flared projections extend into the space between the framework and the master model, masking off the space between the portions of the framework and the master model, completing the female checking fixture to the inside of metal by casting into the masked off space an alloy having such low melting point that it will fill the space between the surfaces of the adjacent portions of the framework and the surface of the master model without injuring said surfaces and engage the outwardly flared projections of the retaining means and solidify with negligible shrinkage thereby providing the framework with a checking surface accurately conforming to the contour of the master model.

5. A checking fixture for use in making dies, comprising a framework and a thin layer of alloy carried by the framework and bonded to retaining means provided thereon, the layer of alloy having a female checking surface accurately conforming to the contour of a male master model of an outstanding portion of an article to be made by the dies, the fixture having its marginal portions shaped so as to permit the checking surface to be brought into contact with the working surface of the dies and having a marginal portion terminated at the desired location of a trim line on said article, and also having a hole extending through the framework and the layer of alloy corresponding to the desired location of a pierced hole on said article, the fixture being adapted for superimposition on stamping, trimming and piercing dies of a set of dies designed for use in successive operations in manufacture of said article, so as to check the form and determine the location of a trimming edge and piercing punch of the respective dies.

6. In a device for checking two coordinated dies designed to be used in imparting the desired form to a stamping in successive steps, the combination comprising a checking fixture member having a checking surface presenting a negative replica of a surface contour desired to be produced in both of said dies, a second checking fixture member attachable to the first in complemental relation thereto and having a checking surface presenting a negative replica of a surface contour desired to be produced in the first of said dies which surface is to differ from the desired corresponding surface contour of the second of said dies, said second checking fixture member being detachable from said first checking fixture member after attachment thereto, whereby said second checking fixture member may be replaced by a third checking fixture member attachable to the first in complemental relation thereto and having a checking surface contour presenting a negative replica of said desired corresponding surface of the second of said dies.

7. In a device for checking two coordinated dies designed to be used in imparting the desired form to a stamping in successive steps, the combination comprising a checking fixture member having a checking surface presenting a negative replica of a surface contour desired to be produced in both of said dies, a second checking fixture member removably attachable to the first in complemental relation thereto and having a checking surface presenting a negative replica of a surface contour desired to be produced in the first of said dies which surface is to differ from the desired corresponding surface contour of the second of said dies, and a third checking fixture member attachable to the first in complemental relation thereto similar to the second checking fixture member, said third checking fixture member having a checking surface presenting a negative replica of said desired corresponding surface contour of the second of said dies.

8. In a method of making two coordinated stamping dies designed to be used successively to impart the desired form to a stamping, the step of making a main checking fixture member having a checking surface presenting a negative replica of a surface contour desired to be produced in a portion of each of the two dies, the steps of making second and third checking fixture members interchangeably attachable successively to said first checking fixture member in complemental relation thereto and having checking surfaces presenting negative replicas of surface contours which differ from each other and conform respectively to stamping surfaces desired to be produced in the respective dies, the step of attaching the first checking fixture member to the second checking fixture member and checking and shaping the material of the first stamping die to conform to the surface contour of the composite checking fixture so formed, and the step of attaching the first checking fixture member to the third checking fixture member and checking and shaping the material of the second stamping die to conform to the surface contour of the checking surface formed by attachment of said first and third checking fixture members together.

9. In a method of making two coordinated stamping dies designed to be used successively to impart the desired form to a stamping, a trimming die designed to be used for trimming the stamping between the successive stamping steps performed by said two coordinated stamping dies, and a trimming die designed to be used for trimming the stamping after the stamping operation performed by the second of said stamping dies, the step of making a main checking fixture member having a checking surface presenting a negative replica of a surface contour desired to be produced in a portion in each of the two stamping dies, the steps of making second and third checking fixture members interchangeably attachable successively to said first checking fixture member in complemental relation thereto and having checking surfaces presenting negative replicas which differ from each other and conform respectively to stamped surfaces desired to be produced in the respective stamping dies, the steps of forming indications on said second and third checking fixture members of the trim lines desired to be imparted to the first- and second-mentioned trimming dies, respectively, the step of attaching the first checking fixture member to the second checking fixture member, the step of checking and shaping the material of the first stamping die to conform to the contour of the composite checking fixture so formed, the step of checking and shaping the material of the first trimming die to provide a trim line and contour conforming to the trim line and contour of the composite checking fixture so formed, the step of attaching the first checking fixture member to the third checking fixture member, the step of checking and shaping the material of the second stamping die to conform to the contour of the checking surface formed by attachment of said first and third checking fixture members together, and the step of checking and shaping the second trimming die to provide a trim line and contour conforming to the trim line and contour of the checking surface formed by attachment of said first and third checking fixture members together.

10. In a method of making two coordinated stamping dies designed to be used successively to impart the desired form to a stamping, a first trimming die designed to be used for trimming the blank between the successive stamping steps performed by said two coordinated stamping dies, and a second trimming die designed to be used for trimming the blank after the stamping operation performed by the second of said stamping dies, the step of making a model having the final surface contour of a stamping to be made by said dies, the step of forming an indication on said model of a line showing the final trimming edge of the stamping, the step of molding a checking surface of a main checking fixture member as a negative replica against a portion of said model having a surface contour desired to be produced in a portion of each of the two stamping dies, the step of molding a checking surface of a second checking fixture member complemental to and removably attachable to the first as a negative replica against a portion of the model complemental to the portion reproduced on the checking surface of the first checking fixture member, the step of forming on the checking surface of said second checking fixture member as indication of the trim line as indicated on said model, the step of attaching thin elongated members to said model transversely of the trim line and indicating on them the crossing points with said line while said checking fixture members are away from the model, the step of removing said members from said model except at a zone remote from the trim line indication on said model, the step of modifying the surface contour of the portion of the model reproduced on said second checking fixture member to conform to that portion of the contour of the first stamping die which is to differ from the contour of the corresponding portion of the second stamping die, the step of extending the free ends of said elongated members along the modified surface so formed and forming by reference to said extended members an indication on the model of the location of the desired intermediate trim line, the step of molding a checking surface of a third checking fixture member complemental to and removably attachable to the first as a negative replica against the modified contour portion of the model, the step of forming on the checking surface of said third checking fixture member an indication of the trim line as indicated on said modified model by reference to said extended members, the step of attaching the first checking fixture member to the second checking fixture member, the step of checking and shaping the material of the second stamping die to conform to the contour of the composite checking fixture so formed, the step of checking and shaping the material of the second trimming die to provide a trim line and contour conforming to the trim line and contour of the composite checking fixture so formed, the step of attaching the first checking fixture member to the third checking fixture member, the step of checking and shaping the material of the first stamping die to conform to the contour of the checking surface formed by attachment of said first and third checking fixture members together, and the step of checking and shaping the material of the first trimming die to provide a trim line and contour conforming to the trim line and contour of the checking surface formed by attachment of said first and third checking fixture members together.

11. In a method of making two coordinated stamping dies designed to be used successively to impart the desired form to a stamping, the step of making a model having the final surface contour of a stamping to be made by such dies, the step of forming a checking fixture by molding against said model a checking surface consisting of a portion presenting a negative replica of a portion of said model having a surface contour conforming to the portion of the contour desired to be imparted to the stamping by the first of said stamping dies and maintained therein during the operation of the second of said stamping dies and of a portion presenting a negative replica of a portion of said model conforming to the portion of the contour desired to be formed in the second of said stamping dies, the step of modifying said last-mentioned portion of the model, the step of making a second checking fixture having a checking surface comprising a portion molded against the first-mentioned portion of the model and a portion molded against the portion of the model so modified, the step of checking and shaping the material of the second of said stamping dies to conform to the contour of said checking surface portions of the first-mentioned checking fixture and the step of checking and shaping the material of the first of said stamping dies to conform to the contour of said checking surface portions of the second-mentioned checking fixture.

12. In a method of making two coordinated stamping dies designed to be used successively to impart the desired form to a stamping, and a trimming die designed to be used for trimming the stamping between the successive stamping steps performed by said stamping dies, the step of making a model showing the final dimensions and contour of a stamping to be made by such dies, the step of indicating on said model a line showing the position of the final edge to be produced in the stamping, the step of attaching thin elongated members to said model transversely to said line and indicating on them the crossing points with said line, the step of removing said members from said model except at a zone remote from the trim line indication on said model, the step of modifying the surface contour of portions of the model so that it corresponds to the contour desired to be imparted to the stamping by the first of said stamping dies, the step of extending the free ends of said elongated members along the modified surface of the model and of indicating on said modified surface by reference to the indications on said members the location of the trimming line to be imparted to the stamping by said trimming die, the step of molding a checking surface of a checking fixture against said model as so modified and forming an indication on said checking surface of the location of the trim line indicated on said modified model, the step of checking and shaping the material of the first of said stamping dies to conform to the contour of the checking surface of said checking fixture, and the step of checking and shaping the material of the trimming die to conform to the contour and trim line indication of said checking fixture.

13. In a method of making two coordinated stamping dies designed to be used successively to impart the desired form to a stamping, and a trimming die designed to be used for trimming the stamping between the successive stamping steps performed by said stamping dies, the step of making a model having the final surface contour of a stamping to be made by such dies, the step of modifying the surface contour of a portion only of the model so that it conforms to the surface contour desired to be imparted to the stamping by the first of said stamping dies, the step of forming a checking fixture having a checking surface molded in part against the unmodified portion of the model and molded in part against the portion of the model so modified, the step of indicating on the checking surface of said checking fixture by measurement referred to the dimensions desired to be produced in the finished stamping, the desired location of a trim line to be imparted by said trimming die by the stamping operations, the step of checking and shaping the material of the first of said stamping dies to conform to the contour of the checking surface of said checking fixture, and the step of checking and shaping the material of the trimming die to conform to the contour and trim line indication of said checking fixture.

FRANK E. McGARY.
EDWARD HOCHREITER.
CHARLES F. SCHLECHT.
FRANK SHANNON.

REFERENCES CITED

The following references are of record in the file of this patent:

UNITED STATES PATENTS

| Number | Name | Date |
| --- | --- | --- |
| 867,541 | Walenta | Oct. 1, 1907 |
| 939,505 | Hotchkiss | Nov. 9, 1909 |
| 1,164,329 | Blackmore | Dec. 14, 1915 |
| 1,634,106 | Hopkinson | June 28, 1927 |
| 1,691,756 | Campbell | Nov. 13, 1928 |
| 1,782,236 | Keller | Nov. 18, 1930 |
| 1,794,627 | Laukel | Mar. 3, 1931 |
| 1,882,755 | Boynton | Oct. 18, 1932 |
| 1,914,569 | Janiszewski | June 20, 1933 |
| 1,995,711 | Irmis | Mar. 26, 1935 |
| 2,039,105 | Naery | Apr. 28, 1936 |
| 2,124,676 | Ryan | July 26, 1938 |
| 2,186,799 | Baker | Jan. 9, 1940 |
| 2,189,154 | Stewart | Feb. 6, 1940 |
| 2,192,937 | Shepard | Mar. 12, 1940 |
| 2,206,088 | Gordon | July 2, 1940 |
| 2,206,812 | Fitzgerald et al. | July 2, 1940 |
| 2,222,860 | Sedwick et al. | Nov. 26, 1940 |